(12) United States Patent
Kang

(10) Patent No.: US 12,452,056 B2  
(45) Date of Patent: Oct. 21, 2025

(54) SYSTEM AND METHOD FOR GENERATING AND MANAGING VIRTUAL REALITY IDENTIFICATION ON BASIS OF REAL-WORLD PERSONAL INFORMATION

(71) Applicant: Minji Kang, Gyeonggi-do (KR)

(72) Inventor: Minji Kang, Gyeonggi-do (KR)

(73) Assignee: Minji Kang, Gyeonggi-do (KR)

( * ) Notice: Subject to any disclaimer, the term of this patent is extended or adjusted under 35 U.S.C. 154(b) by 188 days.

(21) Appl. No.: 18/385,386

(22) Filed: Oct. 31, 2023

(65) Prior Publication Data

US 2024/0146528 A1 May 2, 2024

(30) Foreign Application Priority Data

Nov. 1, 2022 (KR) .......... 10-2022-0143613

(51) Int. Cl.
- *H04L 9/30* (2006.01)
- *G06F 3/01* (2006.01)
- *H04L 9/14* (2006.01)

(52) U.S. Cl.
CPC ............ *H04L 9/3006* (2013.01); *G06F 3/011* (2013.01); *H04L 9/14* (2013.01)

(58) Field of Classification Search
CPC ........... H04L 9/3006; H04L 9/14; G06F 3/011
See application file for complete search history.

(56) References Cited

U.S. PATENT DOCUMENTS

| | | | |
|---|---|---|---|
| 11,557,093 B1* | 1/2023 | Terrano | A63F 13/26 |
| 2023/0362213 A1* | 11/2023 | Bradley | H04L 65/1093 |
| 2024/0146528 A1* | 5/2024 | Kang | H04L 9/14 |

FOREIGN PATENT DOCUMENTS

KR 10-2220084 B1 3/2021

\* cited by examiner

*Primary Examiner* — Luu T Pham  
*Assistant Examiner* — Paul J Skwierawski  
(74) *Attorney, Agent, or Firm* — Nicholas Park

(57) ABSTRACT

A system for generating and managing virtual reality identification (ID) based on real-world personal information includes a user terminal that requests issuance of a virtual ID generated based on real-world personal information and participates in a metaverse virtual space with the virtual ID, and a virtual ID generation and management unit that generates and issues the virtual ID based on the real-world personal information provided by the user terminal and authenticates the validity of the virtual ID when linked to the metaverse virtual space by the user terminal.

2 Claims, 3 Drawing Sheets

SYSTEM AND METHOD FOR GENERATING AND MANAGING VIRTUAL REALITY IDENTIFICATION ON BASIS OF REAL-WORLD PERSONAL INFORMATION

CROSS-REFERENCE TO RELATED APPLICATION

This application claims priority to and the benefit of Korean Patent Application No. 10-2022-0143613, filed on Nov. 1, 2022, the disclosure of which is incorporated herein by reference in its entirety.

BACKGROUND

Technical Field

The present invention relates to a system for generating and managing virtual reality identification (ID) based on real-world personal information.

Background Art

Virtual reality (VR) is a computer technology that uses VR devices such as headsets, sometimes in conjunction with physical spaces or multi-projected environments, to generate realistic images, sounds, and other sensations that simulate the user's physical presence in a digital virtual environment. It allows VR users to interact with the virtual environment.

Many applications, such as those for gaming, content consumption, and productivity, have been developed to provide users with immersive experiences using VR technology. Many VR applications allow for in-application purchases, user customization, or parental control. These operations will require user identity authentication for security purposes.

SUMMARY

Technical Problem

The purpose of the invention is to provide a system and method for generating and managing virtual reality identification (ID) based on real-world personal information, which can solve the problems of the conventional methods.

Technical Solution

According to an embodiment of the present invention for solving the above problem, a system for generating and managing virtual reality identification (ID) based on real-world personal information includes: a user terminal that requests issuance of a virtual ID generated based on real-world personal information and participates in a metaverse virtual space with the virtual ID; and a virtual ID generation and management unit that generates and issues the virtual ID based on the real-world personal information provided by the user terminal and authenticates the validity of the virtual ID when linked to the metaverse virtual space by the user terminal.

In one embodiment, the virtual ID generation and management unit generates a primary key pair, including an encrypted public key and an encrypted private key, by using the Public Key Infrastructure (PKI) algorithm to encrypt the real-world personal information, and randomly generates a virtual ID number based on the hash information of the applied ciphertext.

In one embodiment, the virtual ID generation and management unit generates a secondary key pair, which is encrypted reflecting the virtual world personal information provided by the user terminal, and provides it to the user terminal. The ciphertext of the secondary key pair is stored in a blockchain network for distributed storage. The virtual world personal information includes at least one of the avatar NFT record, virtual world name, age, and virtual world identity generation date as information.

The method of one embodiment of the invention which generates and manages IDs in virtual reality based on real-world personal information to solve the above problem includes: a stage in which a request for registering and issuing a virtual ID card for use within the metaverse virtual space is made from the user terminal; a stage in which the virtual identity generation and registration management unit requests real-world personal information and identity verification from the user terminal; a stage in which, once identity verification is completed on the user terminal, the virtual identity generation and registration management unit generates a primary pair key, including an encrypted public key and an encrypted private key, using the Public Key Infrastructure (PKI) algorithm to encrypt the real-world personal information; a stage in which the virtual identity generation and registration management unit randomly generates a virtual identification ID number based on the hash information of the ciphertext applied to the primary pair key; a stage in which the virtual identity generation and registration management unit requests virtual world personal information from the user terminal and verifies the accuracy of the provided virtual world personal information from a server supporting the metaverse virtual space; a stage in which the virtual ID generation and registration management unit generates a secondary pair key reflecting the virtual world personal information provided by the user terminal to the virtual world identification ID number and provides a public key to the user terminal and distributes and stores the ciphertext of the secondary key pair in a blockchain network; and a stage of issuing a virtual ID card with the applied secondary key pair to the user terminal by the virtual ID generation and registration management unit. The virtual world personal information includes at least one of the below information: avatar NFT record, virtual world name, age, and virtual world identity generation date.

DETAILED DESCRIPTION

Figure 1:
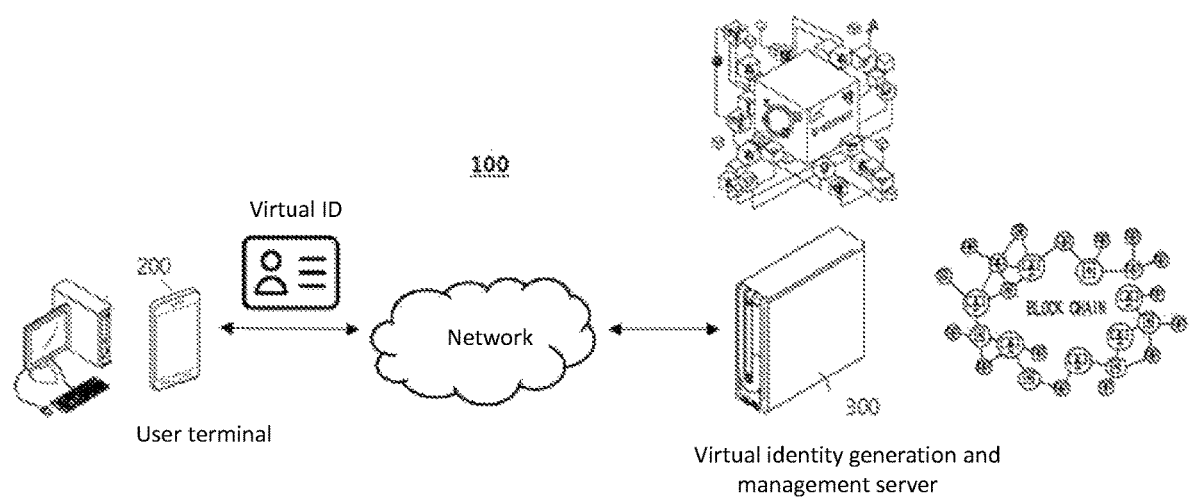
FIG. 1 depicts the network configuration of a system for generating and managing virtual reality identification (ID) based on real-world personal information, according to an embodiment of the present invention.

Below is provided a detailed explanation of an embodiment of the present invention to facilitate those skilled in the art with ordinary knowledge in the field to easily implement the invention, referencing the attached drawings. However, the present invention can be implemented in various different forms and is not limited to the embodiment described herein. Furthermore, to clearly explain the invention in the drawings, irrelevant parts have been omitted, and similar drawing symbols have been assigned for similar parts throughout the entire specification.

Throughout the specification, when it is stated that one part is "connected" to another part, it includes not only cases where they are "directly connected," but also cases where they are "electrically connected" through another element in between. Furthermore, when it is stated that one part "includes" another component, it means that it can include other components in addition to the specifically mentioned ones, unless there is expressly stated otherwise. It should be understood that it does not preclude the presence or possibility of one or more other features, numbers, steps, operations, components, sub-parts, or combinations thereof.

The terms "approximately," "substantially," or similar terms used throughout the specification are used to denote a numerical value that is either stated with a specific manufacturing and material tolerance or is used to represent a value that is close to a certain numerical value. These terms are used to prevent unscrupulous infringers from unfairly exploiting the disclosed content by unnecessarily focusing on precise or absolute numerical values, and instead, to aid in understanding the present invention. The term "a stage in which" or "stage of" used throughout the entire specification of the present invention does not imply "a stage for."

In this specification, the term "unit" encompasses units realized by hardware, units realized by software, and units realized using a combination of both. Furthermore, it is also permissible for one unit to be realized using two or more hardware components, and for two or more units to be realized by a single hardware component. On the other hand, "unit" is not limited to software or hardware and can be configured to be located on addressable storage media. It can also be configured to activate one or more processors. Therefore, as an example, the term "unit" includes components such as software components, object-oriented software components, class components, and task components, as well as processes, functions, attributes, procedures, subroutines, segments of program code, drivers, firmware, microcode, circuits, data, databases, data structures, tables, arrays, and variables. The functionalities provided by the components and "units" can be combined with a smaller number of components and "units," or further separated into additional components and "units." In addition, the components and "units" can also be implemented to activate one or more CPUs within a device or a secure multimedia card.

In this specification, some of the operations or functionalities described as being performed by a terminal, equipment, or device may be performed instead by a server connected to the respective terminal, equipment, or device. Similarly, some of the operations or functionalities described as being performed by a server can also be performed by a terminal, equipment, or device connected to the respective server.

In this specification, some of the operations or functionalities described as mapping or matching with a terminal can be interpreted as mapping or matching with the unique identifying data of the terminal or personal identifying information of an individual.

Based on the attached drawings, a system and method for generating and managing virtual reality identification IDs based on real-world personal information in accordance with an embodiment of the present invention will be described in more detail.

Figure 2:
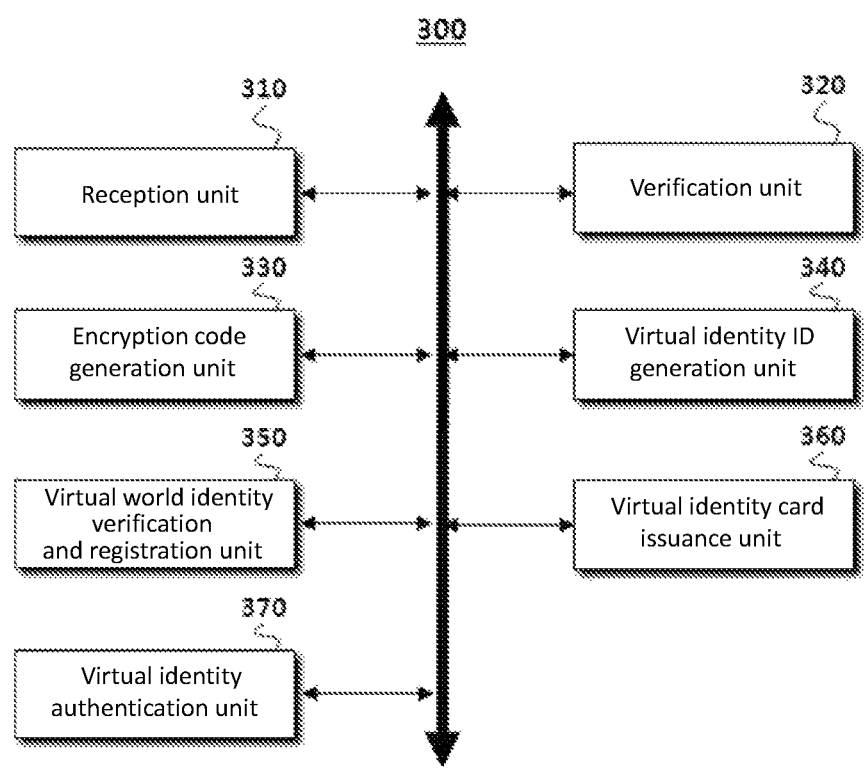
FIG. 2 is a detailed configuration of the virtual identity generation and management unit outlined in FIG. 1.

FIG. 1 is a network configuration diagram of a system for generating and managing virtual reality identification IDs based on real-world personal information in accordance with an embodiment of the present invention, and FIG. 2 is a detailed configuration diagram of the virtual identity generation and management unit shown in FIG. 1.

As shown in FIG. 1 and FIG. 2, a system 100 for generating and managing virtual reality identification IDs based on real-world personal information according to an embodiment of the present invention includes a user terminal 200 and a virtual identity generation and management server 300.

Each component communicates over a network, where the term "network" refers to a connected structure enabling information exchange among multiple nodes such as terminals and servers. Examples of such networks include RF, 3rd Generation Partnership Project (3GPP) network, Long Term Evolution (LTE) network, 5th Generation Partnership Project (5GPP) network, World Interoperability for Microwave Access (WIMAX) network, Internet, Local Area Network (LAN), Wireless Local Area Network (LAN), Wide Area Network (WAN), Personal Area Network (PAN), Bluetooth network, NFC network, satellite broadcasting network, analog broadcasting network, Digital Multimedia Broadcasting (DMB) network, 5G network, 6G network, and so on, but are not limited thereto.

In the following, the term "at least one" is defined as including both singular and plural forms, and even if the term "at least one" is not explicitly mentioned, it is evident that each component can exist in singular or plural form, and can denote either singular or plural. Furthermore, it should be understood that the provision of each component in singular or plural form can be modified according to the embodiments.

The metaverse virtual space mentioned in the present invention can be a computer program, web program, application program, blockchain program, or cloud computer program. It can also be a program operated on a dedicated terminal.

On the other hand, the terminals described in the specification can be dedicated devices for specific purposes, devices that have downloaded and executed applications according to specific purposes, or devices that have been granted certain permissions from the virtual identity generation and management server (300).

The user terminal 200 mentioned above can be configured to provide personal identity information used in the real world, such as the user's name, date of birth, gender, age, country, nickname (or user ID), contact information, email address, occupation (or job title), workplace address, residential address, etc., categorized as required information and optional information.

Furthermore, the user terminal 200 can be a device that receives the virtual identity card (virtual ID) generated and issued based on personal identity information, as well as the public key for identification purposes, from the virtual identity generation and management server mentioned later.

Furthermore, the user terminal 200 can be a device that participates in a metaverse virtual space and undergoes an identity verification process using the issued virtual identity card (virtual ID) and the public key for identification purposes, in order to participate in the aforementioned metaverse virtual space.

The user terminal 200 can refer to the device owned by the user who intends to participate in the metaverse virtual space. The user terminal 200 can include all types of wired and wireless communication devices, including but not limited to Personal Communication System (PCS), Global System for Mobile communication (GSM), Personal Digital Cellular (PDC), Personal Handyphone System (PHS), Personal Digital Assistant (PDA), International Mobile Telecommunication (IMT)-2000, Code Division Multiple Access (CDMA)-2000, Wideband Code Division Multiple Access (W-CDMA), Wireless Broadband Internet (Wibro) terminal, smartphone, smartpad, tablet PC, smart lens, vehicle PC, laptop, wearable devices, desktop PC, and other similar devices.

In addition, the user terminal 200 can be a device (equipment, terminal) that provides at least one technology/service among virtual reality (VR), augmented reality (AR), mixed reality (MR), and extended reality (XR), which encompasses them.

Next, the virtual identity generation and management server 300 can be configured to generate a virtual ID card based on the personal identity information provided by the user terminal 200. After generating the virtual ID card, the server can generate a pair of keys (public key and private key) for identity verification through the blockchain network, and issue the virtual ID card and public key to the user terminal 200.

Furthermore, the virtual identity generation and management server 300 can be configured to verify the identity by validating the issued virtual ID and public key when the user terminal 200 connects to the metaverse virtual space.

Here, the virtual ID is assigned to the user's virtual avatar's information and is used to authenticate the user to other users, even if the appearance of the virtual avatar undergoes changes, which is one of the characteristics of a metaverse virtual space.

Furthermore, the aforementioned virtual ID is issued to have the facial image of the virtual avatar, which may undergo frequent changes in appearance, applied to it. Whenever there is a change in the facial transformation of the user's virtual avatar, it can be applied to the virtual ID.

More specifically, the aforementioned virtual identity generation and management server 300 includes a reception unit 310, an identity verification unit 320, an encryption code generation unit 330, a virtual ID card generation unit 340, a virtual world identity verification and registration unit 350, a virtual ID card issuance unit 360, and a virtual identity authentication unit 370.

The aforementioned reception unit 310 is configured to receive virtual identity registration requests from the user terminal 200 within the metaverse virtual space. It can request the real-world personal information necessary for virtual identity registration from the user terminal that has made the virtual identity registration request.

Here, real-world personal information refers to personal identity information used in the real world, such as the user's name, date of birth, gender, age, country, nickname (or member ID), contact information, email address, occupation (or industry), workplace address, residential address, etc. It is classified as mandatory information or optional information and provided as such.

The aforementioned identity verification unit 320 is configured to receive the personal information necessary for identity verification provided by the user terminal 200 in order to verify the user's identity.

The aforementioned encryption code generation unit 330 can be configured to generate a primary key pair and a ciphertext (hash function) that includes an encryption public key and an encryption private key encrypting the real-world personal information.

Furthermore, the aforementioned encryption code generation unit 330, when the virtual world identity verification and registration unit 350 determines that the user's virtual world identity information is true, can be configured to generate a secondary key pair and ciphertext (hash function) that includes an encrypted public key and an encrypted private key by combining the generated virtual ID number from the virtual ID generation unit 340 to be mentioned later and the virtual world identity information. It can then store the generated secondary key pair and ciphertext in a distributed manner on a blockchain network.

The aforementioned virtual ID generation unit 340 can be configured to randomly generate a virtual ID number using hash functions and/or personal information.

The aforementioned virtual world identity verification and registration unit 350 can be configured to request the virtual world identity information registered on the metaverse virtual space from the user terminal 200. It can be configured to request the confirmation of the registration status of the provided virtual world identity information from the server that services (supports) the respective metaverse virtual space and register the verification result.

The aforementioned virtual ID card issuance unit 360 can be configured to issue the user's virtual ID card based on the secondary key pair and ciphertext (hash function) generated by the aforementioned encryption code generation unit 330 to the user terminal 200. In this case, the virtual ID card issuance unit 360 can provide either one of the secondary key pair to the user terminal 200.

The aforementioned virtual ID authentication unit 370 can be configured to verify the authenticity of the virtual ID card presented by the user terminal 200 when linking to the metaverse virtual space. It does so by referencing the distributed and stored secondary key pair and cipher text stored on the blockchain network.

As previously mentioned, each node of the blockchain network functions as a computing terminal or server and stores a replicated ledger (referred to as a blockchain ledger) of transaction messages recorded on the blockchain. Therefore, all nodes synchronize with each other and hold the same blockchain ledger. Specifically, transaction messages (or simply messages) refer to messages representing a single transaction. These messages can be messages requesting for personal information, authentication result messages, messages providing personal information, and so on.

The hash value of each transaction message is calculated, and these hash values are then used to construct the blockchain. In this case, the blockchain ledger includes both the blockchain, which is constructed by chaining the hash values of each message into blocks, and all the transaction messages (or messages) themselves. By accessing the messages in the blockchain ledger, one can read the content of the respective messages. Additionally, by authenticating the hash values in the blockchain, one can verify the integrity and authenticity of the messages.

In particular, when a node performs a transaction operation, it adds the new transaction message to its own blockchain ledger and then transmits the updated block information to other nodes. The additional information or block is appended to the existing blockchain ledger as part of the blockchain. In addition, other nodes receive the updated block information from the node that performed the update and add the block information to their own blockchain ledger. Ideally, nodes transmit the update information (additional information) regarding the added blockchain to the nodes located in their vicinity.

In that case, the neighboring nodes record the update information about the blockchain in their own blockchain ledger, and again transmit it to their neighboring nodes. Therefore, all nodes within the blockchain network synchronize their blockchain ledgers and end up holding the same blockchain ledger that includes authentic product data.

Figure 3:
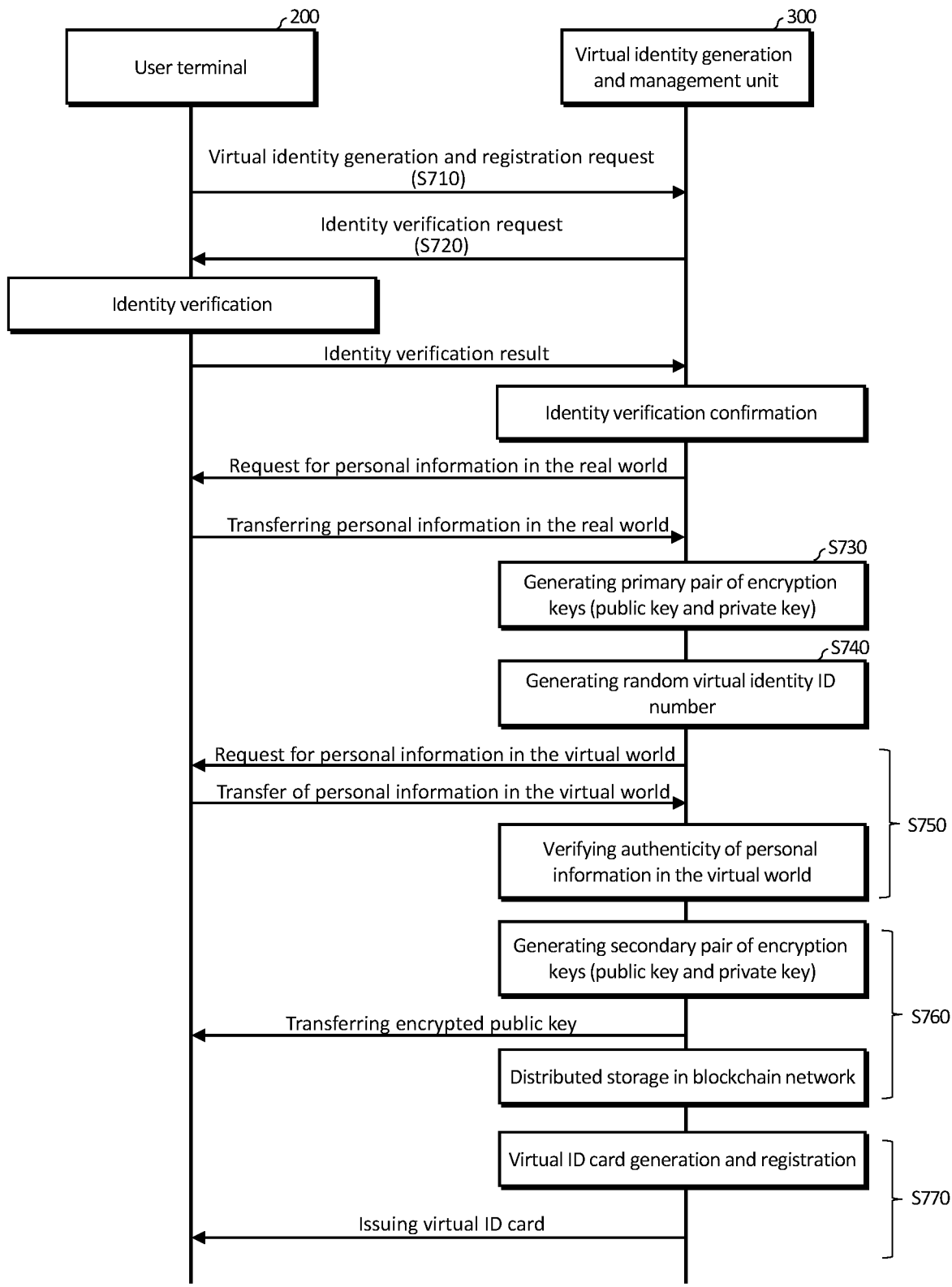
FIG. 3 is a flowchart describing a method for generating and managing virtual reality identification IDs based on real-world personal information according to an embodiment of the present invention.

FIG. 3 is a flowchart of a method for generating and managing virtual reality identification IDs based on real-world personal information according to an embodiment of the present invention.

Referring to FIG. 3, the method for generating and managing virtual reality identification ID S700 based on real-world personal information according to an embodiment of the present invention begins by receiving a request for registering and issuing a virtual ID card S710 to be used within the metaverse virtual space from the user terminal 200. The virtual ID card generation and registration management unit 300 then requests real-world personal information and identity verification S720 from the user terminal.

After the user terminal 200 completes the identity verification process, the virtual ID card generation and registration management unit generates a primary key pair using Public Key Infrastructure (PKI) algorithm S730, which includes an encryption public key and an encryption private key that encrypts the real-world personal information. The virtual ID card generation and registration management unit 300 then randomly generates a virtual ID number based on the hash information of the ciphertext applied to the primary key pair S740.

Next, the virtual ID card generation and registration management unit 300 requests virtual world personal information from the user terminal 200 and verifies the authenticity of the provided virtual world personal information from a server that supports the metaverse virtual space S750. The virtual ID card generation and registration management unit 300 then generates a secondary key pair by incorporating the virtual world personal information provided by the user terminal 200 and encrypting it, and provides the public key to the user terminal. After that, the ciphertext of the secondary key pair is stored in the blockchain network in a distributed manner S760. Finally, the virtual ID card with the applied secondary key pair is issued S770 to the user terminal 200, completing the entire process.

In this context, the virtual world personal information can include information such as avatar NFT records, virtual world names, age, or the date of virtual world identity generation, and it can include any other personal information used in the virtual world, not limited to the information mentioned in the present invention.

Therefore, the present invention relates to a system for issuing and managing blockchain-based virtual reality identification (ID) numbers based on user information in the real world. The system receives user's identification information or biometric information through a user terminal and generates key pairs and hash values based on this information. Based on the generated hash value, a virtual ID number for proof of virtual identity is generated, and additional virtual world personal information is received to register the virtual ID card. By utilizing the personal identification key on the blockchain network that is registered for the same user in different services with different identifiers, the virtual identity data of the user in the virtual world can be provided on the blockchain network. This provides the advantage of being able to track and utilize the virtual reality identity data of a user in different services through the personal identification key.

Through the mentioned advantages, it is possible to reduce fraud and crime rates utilizing variability and anonymity, and users can experience a more trusted virtual world.

In an embodiment of the present invention, the term "unit" used can be implemented as a hardware component, software component, and/or a combination of hardware and software components. For example, the devices and components described in the embodiments can be implemented using one or more general-purpose computers or specialized computers, such as processors, controllers, arithmetic logic units (ALU), digital signal processors (DSP), microcomputers, field-programmable arrays (FPA), programmable logic units (PLU), microprocessors, or any other devices capable of executing instructions and responding accordingly. The processing device can execute one or more software applications, including an operating system (OS) and any software applications executed on the OS. In addition, the processing device can respond to the execution of software by accessing, storing, operating, processing, and generating data. For convenience of understanding, there are cases where a single processing device is described. However, those skilled in the art will appreciate that in the relevant technical field, a processing device may include multiple processing elements and/or multiple types of processing elements. For example, a processing device could include multiple processors or a combination of a processor and a controller. In addition, other processing configurations, such as parallel processors, are also possible.

Software may include a computer program, code, instructions, or a combination of one or more of these, and can be configured to operate a processing device as desired, either independently or collectively, instructing the processing device accordingly. Software and/or data may be permanently or temporarily embodied in any type of machine, component, physical device, virtual equipment, computer storage medium or device, or transmitted as signal waves, in order to be interpreted by a processing device or to provide instructions or data to a processing device. Software can also be distributed and stored or executed in a distributed manner on computer systems connected through a network. Software and data can be stored on one or more computer-readable recording media.

The method according to an embodiment of the present invention can be implemented in the form of program instructions that can be executed through various computer means and recorded on computer-readable media. The computer-readable media mentioned above may include program instructions, data files, data structures, or a combination thereof, either independently or in combination. The program instructions recorded on the aforementioned media may be specially designed and configured for the embodiments or may be made available to computer software entities through disclosure. Examples of computer-readable recording media include magnetic media such as hard disks, floppy disks, and magnetic tapes, optical media such as CD-ROMs and DVDs, magneto-optical media such as floptical disks, and hardware devices specially configured to store and execute program instructions, such as read-only memory (ROM), random-access memory (RAM), and flash memory. Examples of program instructions include machine language code generated by a compiler, as well as high-level language code that can be executed by a computer using interpreters or similar means. The above mentioned hardware devices can be configured to operate as one or more software modules to perform the functions of the embodiments, and vice versa.

The disclosed content can be modified and altered within the scope of the essential features of the present invention by those skilled in the art with ordinary knowledge in the field to which the invention belongs without departing from the essence of the invention. Therefore, the disclosed embodiments in the present invention are not intended to limit the technical concept of the present invention but rather to describe it. The scope of the technical concept of the present invention is not limited by these embodiments. The scope of protection of the present invention should be interpreted in accordance with the claims below, and all technical concepts within the equivalent scope should be interpreted as falling within the scope of the rights of the present invention.

DESCRIPTION OF SYMBOLS

100: System for generating and managing virtual reality identification IDs based on real-world personal information.
200: User terminal
300: Virtual identity generation and management server
310: Reception unit
320: Verification unit
330: Encryption code generation unit
340: Virtual identity ID generation unit
350: Virtual world identity verification and registration unit
360: Virtual identity card issuance unit
370: Virtual identity authentication unit

What is claimed is:

1. A system for generating and managing a virtual reality identification (ID) on the basis of real-world personal information, the system comprising:
a memory and at least one processor,
wherein the at least one processor is configured to execute operations comprising:
requesting, by a user terminal, registration and issuance of a virtual ID to be used in a metaverse virtual space;
requesting, by a virtual identity generation and management part, real-world personal information and identity verification from the user terminal;
when the identity verification is completed in the user terminal, generating, by the virtual identity generation and management part, a primary key pair including an encryption public key and an encryption private key obtained by encrypting the real-world personal information using a public key infrastructure (PKI) algorithm;
randomly generating, by the virtual identity generation and management part, a virtual ID number on the basis of hash information of a cryptogram applied to the primary key pair;
requesting, by the virtual identity generation and management part, virtual-world personal information from the user terminal and checking whether received virtual-world personal information is true through a server for supporting the metaverse virtual space;
generating, by the virtual identity generation and management part, a secondary key pair by reflecting the virtual-world personal information provided by the user terminal in the virtual ID number and encrypting the virtual ID number, providing a public key to the user terminal, and storing a cryptogram of the secondary key pair in a blockchain network in a distributed manner, and
issuing, by the virtual identity generation and management part, a virtual ID to which the secondary key pair is applied to the user terminal,
wherein the virtual-world personal information is information including at least one of an avatar non-fungible token (NFT) record, a virtual-world name, an age, a virtual-world identity generation date, and a unique virtual-world ID number.

2. A method of generating and managing a virtual reality identification (ID) on a basis of real-world personal information, the method comprising:
requesting, by a user terminal, registration and issuance of a virtual ID to be used in a metaverse virtual space;
requesting, by a virtual identity generation and management part, real-world personal information and identity verification from the user terminal;
when the identity verification is completed in the user terminal, generating, by the virtual identity generation and management part, a primary key pair including an encryption public key and an encryption private key obtained by encrypting the real-world personal information using a public key infrastructure (PKI) algorithm;
randomly generating, by the virtual identity generation and management part, a virtual ID number on the basis of hash information of a cryptogram applied to the primary key pair;
requesting, by the virtual identity generation and management part, virtual-world personal information from the user terminal and checking whether received virtual-world personal information is true through a server for supporting the metaverse virtual space;
generating, by the virtual identity generation and management part, a secondary key pair by reflecting the virtual-world personal information provided by the user terminal in the virtual ID number and encrypting the virtual ID number, providing a public key to the user terminal, and storing a cryptogram of the secondary key pair in a blockchain network in a distributed manner; and
issuing, by the virtual identity generation and management part, a virtual ID to which the secondary key pair is applied to the user terminal,
wherein the virtual-world personal information is information including at least one of an avatar non-fungible token (NFT) record, a virtual-world name, an age, a virtual-world identity generation date, and a unique virtual-world ID number.

* * * * *